United States Patent
Amar et al.

(10) Patent No.: US 8,539,157 B2
(45) Date of Patent: Sep. 17, 2013

(54) CACHE MEMORY STRUCTURE AND METHOD

(75) Inventors: Virginie Amar, Biot (FR); Luc Capanaccia, Antibes (FR); Guillaume Touffait, Valbonne (FR); Sébastien Pellise, Valbonne (FR); Xavier Leblanc, Valbonne (FR)

(73) Assignee: Amadeus S.A.S., Sophia Antipolis (FR)

( * ) Notice: Subject to any disclaimer, the term of this patent is extended or adjusted under 35 U.S.C. 154(b) by 207 days.

(21) Appl. No.: 13/068,143

(22) Filed: May 3, 2011

(65) Prior Publication Data

US 2012/0265939 A1 Oct. 18, 2012

(30) Foreign Application Priority Data

Apr. 12, 2011 (EP) .................................... 11305430

(51) Int. Cl.
*G06F 13/00* (2006.01)
(52) U.S. Cl.
USPC ................... 711/130; 711/153; 711/E12.103; 707/695

(58) Field of Classification Search
USPC .................. 711/130, 153, E12.103; 707/695
See application file for complete search history.

(56) References Cited

U.S. PATENT DOCUMENTS

| | | | |
|---|---|---|---|
| 5,617,530 A * | 4/1997 | Stallmo et al. | 714/6.12 |
| 7,257,689 B1 | 8/2007 | Baird | 711/162 |
| 2004/0010663 A1* | 1/2004 | Prabhu | 711/143 |
| 2005/0114604 A1* | 5/2005 | Artobello et al. | 711/130 |
| 2006/0136516 A1 | 6/2006 | Jain et al. | 707/204 |
| 2010/0235580 A1* | 9/2010 | Bouvier | 711/129 |

* cited by examiner

*Primary Examiner* — Edward Dudek, Jr.
(74) *Attorney, Agent, or Firm* — Wood, Herron & Evans LLP

(57) ABSTRACT

The invention relates to a cache memory and method for controlling access to data. According to the invention, a control area which is advantageously formed separate from a data area is provided for controlling the access to data stored in the cache and to be read by applicative processes. The control area includes at least one release area with offsets and data version definition sections.

Application to shared memories for client server architectures.

16 Claims, 9 Drawing Sheets

CACHE MEMORY STRUCTURE AND METHOD

FIELD OF THE INVENTION

The present invention relates in general to the field of data processing and in particular to distributed client/server software architectures where data cache files are distributed over a plurality of middleware processing nodes from a master database. Still more specifically, the present invention relates to a method and a system to keep controlling versions of the distributed cache files notably for middleware applicative processes that make use of them.

BACKGROUND OF THE INVENTION

The client/server model which has emerged in the late 1980s is a versatile and modular software architecture that was devised to improve usability, flexibility, interoperability, and scalability as compared to centralized, mainframe, time sharing computing that was the norm at that time. The client/server architecture has since progressively completely replaced the previous mainframe software architectures where all intelligence was within the central host computer and where users interacted with the host through dumb terminals. If mainframes are still however in use it is only as powerful servers in various client/server architectures where dumb terminals have also been replaced by intelligent graphical user interfaces (GUI) capable of self processing the received and transmitted data from/to servers.

In modern data processing systems, a client/server architecture largely in use and capable of supporting a large number of remotely located clients is the so-called 3-tier architecture. An example of such architecture is illustrated in FIG. 1. The data tier 100 is traditionally built around a master database system 120, possibly a large or very large repository of all the data necessary to the daily operation of any business organization, company or enterprise in order to conduct all sorts of commercial and administrative operations. Database is mostly of the relational type, i.e., is under the control of a relational database management system or RDBMS. It is typically administrated through one or more master servers 112 by administrators of the data processing system from GUI's 140. Administrators are generally the sole users of the system authorized to update directly database contents.

The intermediate or middle tier of the exemplary 3-tier system of FIG. 1 is the application tier 200 from where all the specific software applications 240 of the organization, owner of the data processing system, are run. This collection of specific applications, often globally referred to as the middleware software, is the proprietary software of the organization. It is used to serve all organization's remote clients from its repository of data 120 through the master servers 110. Remote clients form the third tier 300 of the 3-tier architecture. Queries from client tier 300 are thus processed and responded by the specific applications of the intermediate tier 200 on data fetched from the data tier 100.

In a 3-tier architecture, when a larger number of remote clients need to be served, scalability of the system to maintain global performances is obtained by adding independent processing nodes in the middle tier so as to increase the overall processing power of the data processing system. Hence, the application tier 200 is generally comprised of several independent processing nodes that are referred to, in the following description, as slave nodes 210. Then, a common practice to prevent data tier 100 from being overwhelmed by too many data requests from an increasing number of slave nodes, is to have the applicative processes 240 working on pieces of data brought from the master database and stored in each application node as long as necessary. In the exemplary system of FIG. 1 this takes the form of cache files 250 on which the applicative processes 240 can work without having to incur long delays to get them from the master database through the master servers each time they are needed. In such a data processing system processing power and software applications are thus distributed, i.e., replicated, on as many nodes 210 as necessary to reach the level of processing power necessary to serve all remote clients 300 of the system. So are the distributed cache files 250. In each node cache files 250 are typically shared between all applicative processes 240 running on the node. To this end, cache files are stored as memory-mapped files in shared-memory 230 in order to let all applicative processes have a fast access to the pieces of data, coming from the master database, on which they have to work.

The slave node operating system imposes that memory-mapped files be given their size when created. Thus, the file size remains the same during the whole life of a cache file. As shown in FIG. 2, cache files 250, implemented as memory-mapped files 10, are structured in two parts. First part is a data area 20 that stores all applicative data content of a memory-mapped file while second part is a control area 30 which holds the control data. The data area is further split in two parts organized as two linked lists of data blocks. One of the linked lists 23 holds a previous level of data, i.e., the old data, under the form of inactive data blocks 24. The other linked list 21, stores the current level of data in active data blocks 22. However, active and inactive linked data blocks share the same memory-mapped file area, i.e.: the data area 20.

The control area 30 indicates which linked list contains the active data. A flip-flop mechanism, part of the control area, allows toggling between active 31 and inactive 32 pointers to the linked lists of data blocks so that any applicative process reading a memory-mapped file is always given access to up-to-date data. Hence, during the replication of data from the master database, the data blocks of the inactive part are first cleared to be filled with the new incoming data. At completion of new data insertion, control area is edited so that the above flip-flop mechanism flips between active and inactive parts within the data area of a memory shared file. However, the above current mechanism raises two issues:

A first issue deals with the amount of new data to be stored versus the actual size of the memory-mapped file. As already mentioned above, the memory-mapped file size cannot be changed dynamically to follow rise or reduction of the data to store. Hence, if the amount of data to store grows beyond the available size, a memory-mapped file cannot be actually updated. Thus, content of corresponding cache file becomes outdated. A manual action is then required to correct the problem. The size of the memory-mapped file must be increased before resuming replication. Conversely, much memory resources are wasted when memory-mapped files are over-sized. Also, when the amount of data to store decreases the current mechanism cannot take advantage of it in reducing the size of the memory-mapped file.

A second issue occurs during replication if, for any reason, process fails completing normally. Since active and inactive data blocks share a same data area, writing into the inactive part of the data area can also possibly corrupt the active part of the memory-mapped file. If the replication process fails writing the full list of data blocks the corresponding linked list is indeed corrupted. Unpredictable results must then be expected like addressing blocks of the active part thus breaking the data area division between active and inactive parts.

The two above issues are critical for the client applications impacted because of the inevitable service interruptions they trigger when occurring. In order to be able to notify the impacted clients and to prevent data corruption from further propagating, a standard practice of the replication process consists in locking the memory-mapped file before writing the data. The lock is released at the end of the replication unless replication does not end normally. Even though the lock mechanism prevents data corruption from further propagating and provides to clients the possibility of viewing the corrupted files, it does not however help to recover in an automated manner.

The current replication process thus suffers from a lack of resiliency and requires manual actions because, as discussed above:
   size of memory-mapped files is a static parameter that needs to be set manually and which leads to waste much memory resources if over sized for the application;
   flip-flop mechanism between files within the shared data area does not prevent corruption of linked lists from happening;
   and, lock mechanism is not recovered in an automated manner.

It is therefore a general object of the invention to bring a solution to at least some of the above drawbacks and limitations of the current replication mechanism of cache files into a shared-memory of a middleware processing node from a master database. It is a particular object of the invention to obtain that replication of cache files be unconditionally a corruption-free process for existing cache files even though a replication operation may occasionally fails or does not complete as expected.

It is another object of the invention to provide a new cache structure where data versions can be controlled in an easier way.

Further objects, features and advantages of the present invention will become apparent to the ones skilled in the art upon examination of the following description in reference to the accompanying drawings. It is intended that any additional advantages be incorporated herein.

SUMMARY

The invention relates to a cache structure comprising a data area with a plurality of cache files each storing one version of a set of data; a control area comprising at least one release area, said release area comprising at least one version area with plural version sections each storing at least one key addressing data of one single cache file, as many offsets as version sections, each offset pointing to one version section.

An intermediary structure is thus formed separate from the data area.

In one aspect of the invention the exemplary embodiments provide a control area is a file separate from the data area so that a better protection of the control portion versus the data portion is provided.

In another aspect of some embodiments, three offsets and three version sections are provided which enables pointing steps differing from the conventional flip flop mechanism. The use of three offsets render the shift between versions more secure and preserve the availability to data by applicative processes even in case of crash during an update stage. In addition, one of the three offsets may be used to maintain an access—even transitory—to the replaced version section; thus applicative processes which started working with the previously current version section can continue operating even if a new version section has been introduced and is effective (i.e. can be accessed as current version section). The shift to a new version section always starts by resetting the memory of that version section. Since the access to the key location value through version section is not atomic (like find a map key); two fast successful consecutive version shifts, using a basic flip flop mechanism, would conflict with the key read. The transitory access, provided by the use of three offsets, copes with this.

The invention also relates to a method for controlling access to data stored in a cache memory during update stages comprising the steps of:
   using a cache memory structure of the invention;
   pointing to each version section with one distinct offset;
   defining one offset as current offset pointing to one version section defined as current version section and addressing versions of the set of data defined as current data.

BRIEF DESCRIPTION OF THE DRAWINGS

The present invention will now be described in details with reference to the drawings for the purpose of illustrating preferred embodiments.

DETAILED DESCRIPTION

Figure 1:
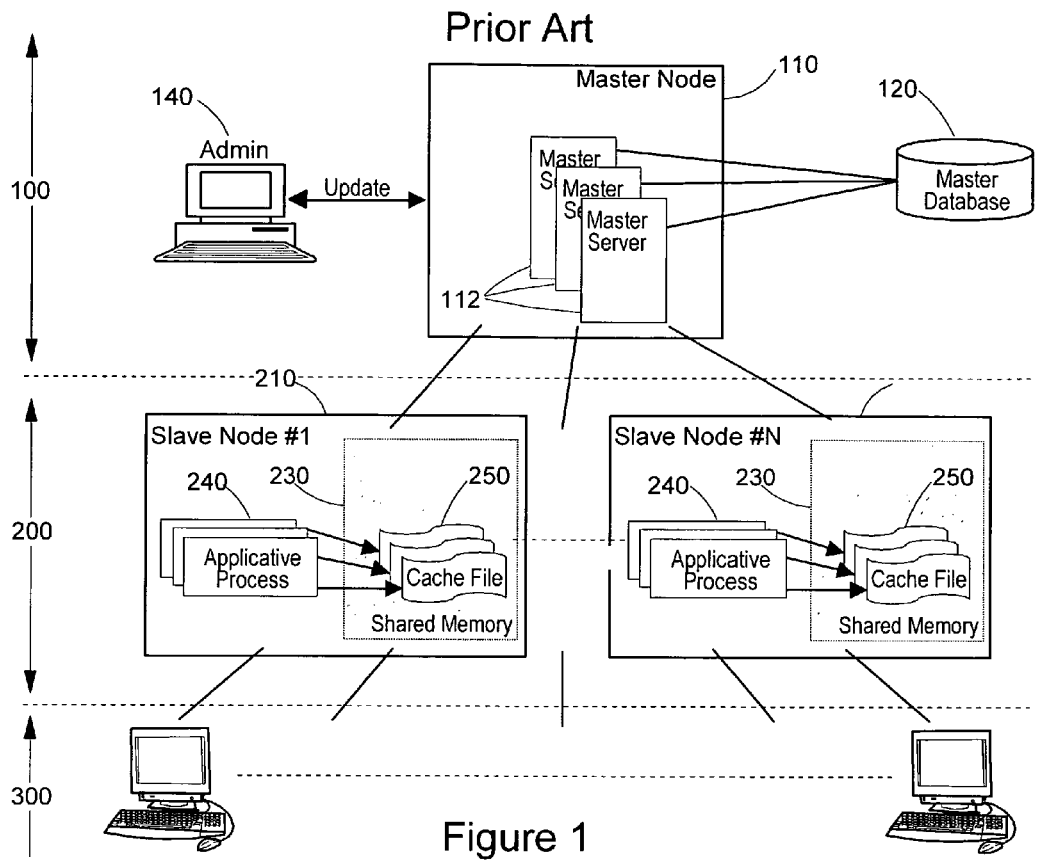
FIG. 1 illustrates a 3-tier computing architecture of the prior art in which the invention is carried out.
Figure 2:
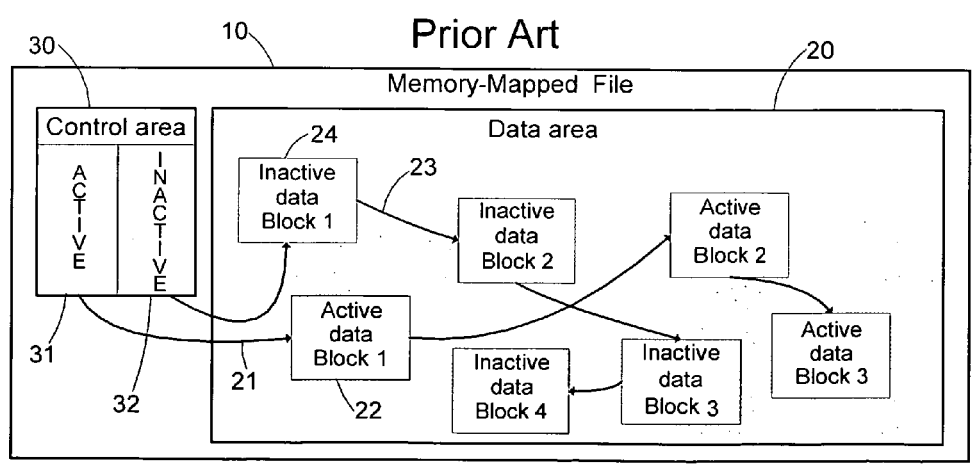
FIG. 2 illustrates a cache file structure of the prior art.

A few definitions of terms used in the following description are given below:
   data area here means a portion of cache memory where data are stored and are subject to writing and reading operations when accessed by processes. In one preferred embodiment, reading operations are made by applicative processes whereas writing operations are administrator's tasks. When data are updated/replaced/created by an administrator computer device, the data are made available to the applicative processes for reading purpose. In one preferred embodiment, the data are organized in sets of data, each representing the definition of an object. By way of example, a list of rules or fare definitions or flight schedule data of an airline computerized system can be used as objects. An object can also consist in the content of a single data field. The objects defined by sets of data are typically subject to modification usually reflecting modifications made in a master database by an administrator which means that the sets of data need to be updated or replaced. This also involves that the invention has to deal with plural versions of an object so that plural versions of a set of data coexist for the same object. The objects can also be grouped by package. By way of example, different lists of rules handling flight schedules can be grouped in a flight schedule package. However the package can still be view as a single object, i.e. set of data. The term snapshot is also used in the description as corresponding to one version of set of data defining one object, or given versions of set of objects. One cache file is advantageously but not limitatively dedicated to each snapshot or version of a set of data. Typically the data of the data area are for access by at least one applicative process—which here means any computer process run by at least one processor of at least one computer device—to which these data are helpful. Applicative processes may comprise read processes of a search engine such as a fare search engine used in global distribution systems of the travel industry. Conventional hardware means can be implemented to support the cache of the invention. The data access mode can rely on shared-memory current techniques and on memory-mapped file concept which enables a correspondence between the physical storage of data and the applicative process view of these data.

control area here means a portion of the cache used to control the access by processes to the data of the data area presented above. The control area is preferably contained within one or several dedicated files of the cache, segregated from the data area. Said file is hereafter called control file or version control file. It will be later described that the control area may co act with other control means in embodiments where an entry point area is implemented. And a plurality of control areas, advantageously each in a separate file, can be used.

area (as used for the control area, the data area or the entry point area) refers broadly to a portion of the cache memory which may not be a continuous segment of said memory.

keys represent small size data specifying the address of stored data. The value of a key provides the location of the corresponding stored data. Keys does not necessarily address sets of data of the same size: a key can be used to access a specific field in a set of data describing a sigger object. A different key can be used to access the area where the set of data of the object are, or the area where the objects are. Another key can be used to access a previous snapshot of the object. A set of keys is used to access different snapshots of same object. Each set of data in the data area is uniquely identified by a key. Keys are preferably kept small, but can have any arbitrary size. The sole constraint is that each set of data must be associated to a unique fixed key.

The purpose of the version control area is to materialize each key into a way to access to the data set, by example by linking it to a memory address. Therefore a key might be considered as equivalent to an address or access link for the comprehension of the invention.

Before describing in detail preferred embodiments of the invention in connection with the figures, some optional features of the invention are introduced hereafter; they can be used alternatively of cumulatively wherein:
  The version section contains a structure (like map) allowing adding or removing keys.
  Snapshots of data can be grouped by domain. The same control structure is applied at domain level.
  the control area comprises now a main release area with main version sections, each of said main version sections comprising, for each domain, domain definition data including an access link to a dedicated release area, said domain release area
  the main release area comprises as many main offsets as main version sections, and, for each domain release area as many domain offsets as domain version sections.
  It is consisting in a shared memory;
  The control area can also be managed using release area concept. The entry point control area is comprising now:
    a plurality of control areas;
    an entry point release area comprising entry version sections, each defining an access link to one separate control area.
    the entry point control area comprises as many entry offsets as entry version sections, each entry offset pointing to one entry version section.

According to preferred embodiments the method may include at least one of the following steps:
  defining one offset as new offset pointing to one version section defined as new version section, differing from the current version section;
  clearing the new version section;
  storing a new version of at least one set of data in a cache file of the data area;
  storing new version information in the new version section;
  letting the current offset point to the new version section.
  providing the release area with three offsets and with three version section;
  pointing to each version section with one distinct offset;
  defining a first offset as current offset pointing to one version section defined as current version section and addressing versions of the set of data defined as current data;
  defining a second offset as new offset pointing to one version section defined as new version section, differing from the current version section;
  defining a third offset as old offset pointing to one version section defined as old version section;
  clearing the new version section;
  letting the old offset point to the current version section;
  letting the current offset point to the new version section;
  letting the new offset point to the old version section.
  after letting the old offset point to the current version section, of enabling access by an applicative process to the data of a cache file addressed by the version section pointed to by the old offset.
  enabling the access is of a finite time.
  using a cache memory structure.
  defining one entry offset as current entry offset pointing to one entry section defined as current entry section;
  enabling an access by an applicative process to the control area addressed by the current entry offset.

The invention is also directed towards a computer program product storing a computer program comprising instructions adapted to perform the invention's method. The program can be stored in any transitory medium such as any computer readable memory.

Figure 3:
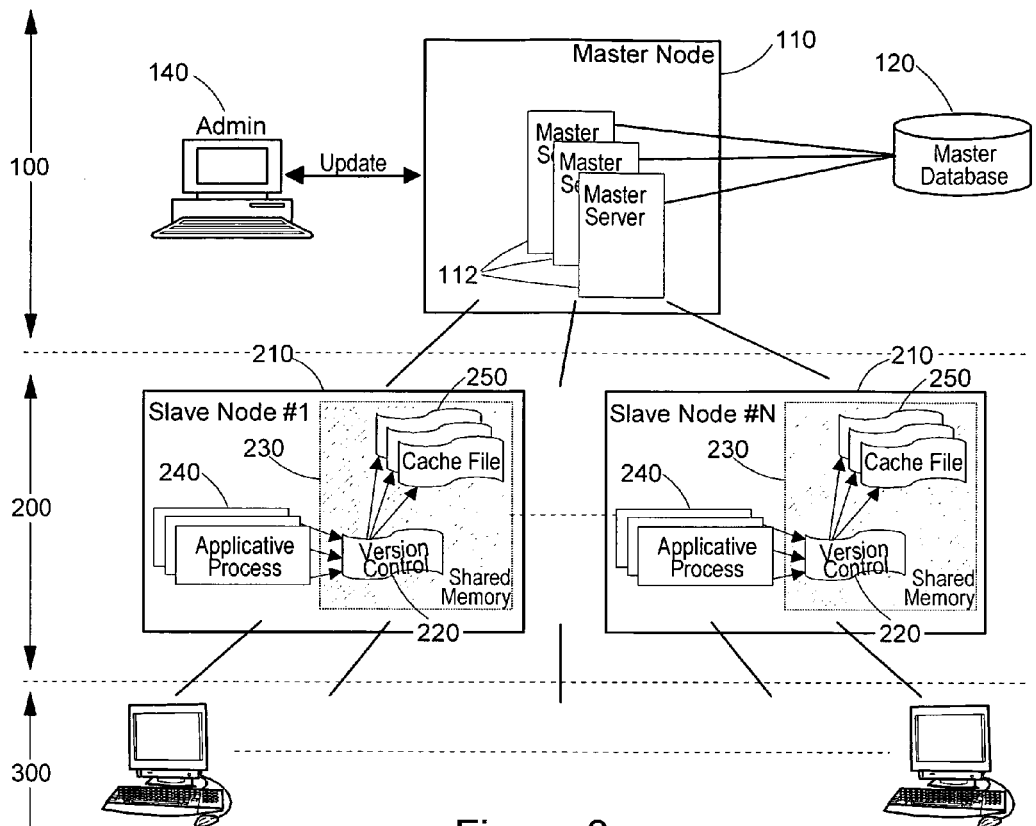
FIG. 3 shows how the invention is implemented with the help of a version control file in the middle tier of a 3-tier computing architecture.

FIG. 3 shows, in the 3-tier architecture environment discussed in the background section, how the invention is implemented with the help of a version control file.

To achieve its objectives the invention uses in each shared-memory 230 an intermediary cache file 220. Referred to as a 'control file' this file is used to manage all accesses from applicative processes 240 to the various levels of cache files 250 stored in the shared-memory. As shown, all the applicative processes 240 go now trough the version control file 220 to access the cache files 250 and implement a corruption-free replication mechanism.

The control area implemented with the version control file 220 can be viewed as a map structure in which the keys are the versioned data and the values the location of the given version of the data. The cache version control is made accessible in the following ways:

in write: a new key is added along with its initial version in write: the value of an existing key is updated in read: the current value of a key is fetched In the preferred context of the invention where the read to write ratio is high, a write access must not impact any read access. In other words, whatever the write operation being performed, all key values must stay accessible to reading. As explained in the following figures the invention thus manages to resolve following issues:

Writing keys and values into cache memory cannot be an atomic operation. In spite of this, read operations are not put on hold during a write operation. Instead, the operation of writing into cache files is interruptible. Incomplete write operations are thus made capable of resuming at completion of reading.

Once the cache version control is initialized, it can contain a finite amount of keys. Whenever it is necessary to add a new key the invention manages to allocate new area in shared-memory when this finite amount is reached.

Concurrent writes are handled by granting exclusive access rights to write operations.

Figure 4:
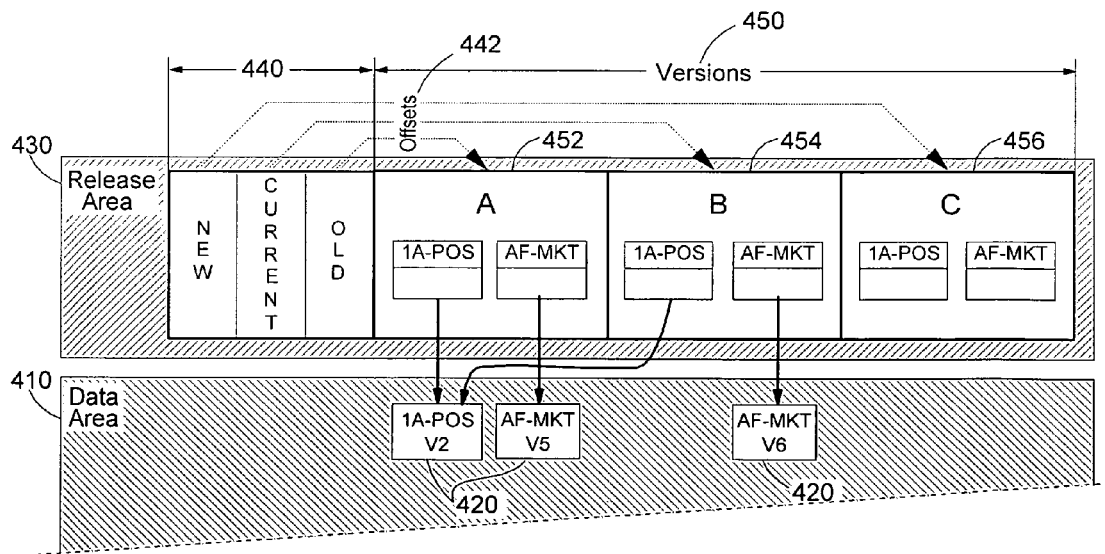
FIG. 4 shows a basic structure of the version control file.

FIG. 4 shows a basic structure of the control area corresponding to the control file 220.

Atomicity of a group of several write operations is obtained in shared-memory while maintaining precedence of read-only operations over writes, i.e., without interrupting the read service, in organizing the version control as explained hereafter:

A data partition of the shared memory, named data area 410, is devoted to store all snapshots of data received at any given time.

Each data snapshot is stored in its own dedicated area 420 of shared memory; such dedicated area 420 is preferably one cache file 250 depicted in FIG. 3.

An area of shared memory, named release area 430, is aimed at controlling versions of the received data snapshots, i.e., indicate which data snapshot is the current one.

The release area indicates which one is the current data snapshot among one or several sets of data.

The addition of a new snapshot of data is performed in an atomic way. The invention assumes that updating an offset, i.e., an integer value, in shared-memory is an atomic operation.

The shared-memory data area 420 has not to be of a predetermined size. Size is computed at building time to fulfil the requirements of the software applications using the shared-memory. On the contrary, the shared-memory release area has a fixed size which is divided into four sub-areas as follows:

One area 440 contains the offsets 442 to address three version sections contained in a version area 450. The three version sections consist of:

a current version section 454 which contains the address (otherwise said a key) of the current snapshot of each set of data;

a new version section 456 which contains the address of the new or latest data snapshot of the sets of data;

an old version section 452 contains the address of each data snapshot previously identified as current.

Each version section has a fixed size and can only handle a maximum finite number of snapshots. This means that a finite number of keys addressing snapshots can be handled.

FIGS. 5a to 5i illustrate the steps of the method to add in an atomic way a new data snapshot in the shared-memory.

Figure 5A:
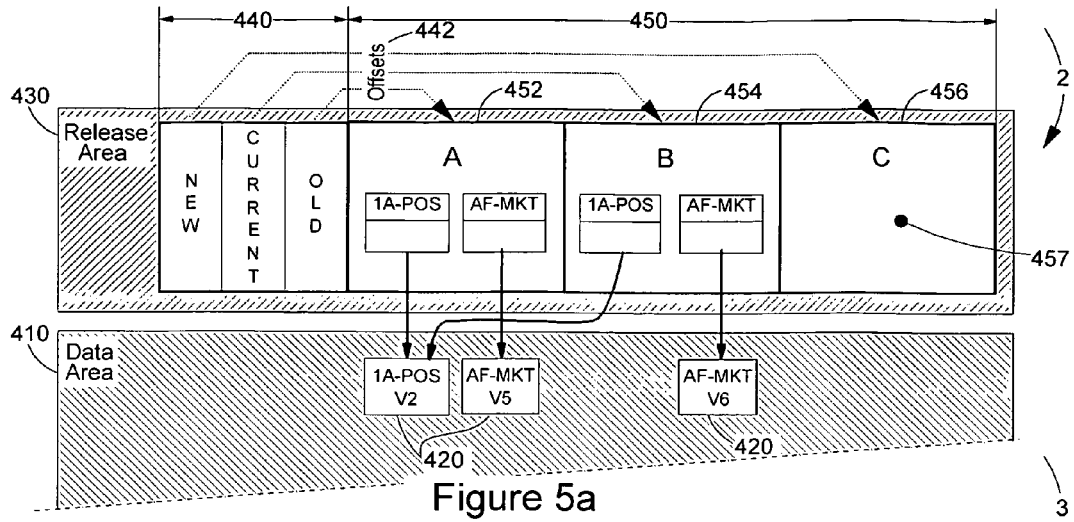
FIGS. 5a to 5i illustrate the steps of the method to add in an atomic way a new data snapshot in the shared-memory.
Figure 5B:
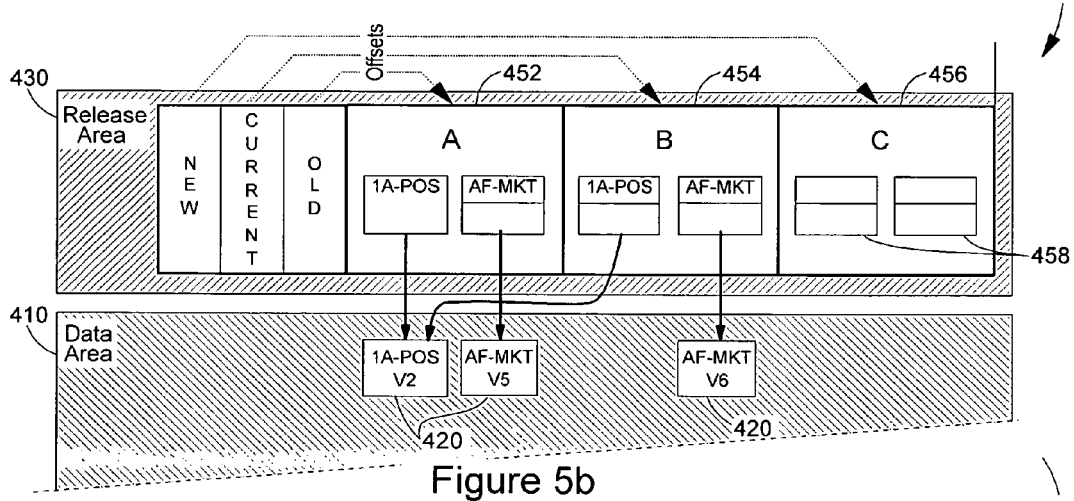

As shown in FIG. 5a, after having checked consistency of offsets in the area 440 and applied corrections if necessary, a preliminary step which is discussed hereafter, the first following step or step 2 consists in clearing the new version section 456, i.e., setting all bits to zero (457). Then, the new version section 456 is initialized (458); i.e., internal structure containing couple <key, location value> is created at next step 3. The result of this latter step is shown in FIG. 5b.

Figure 5C:
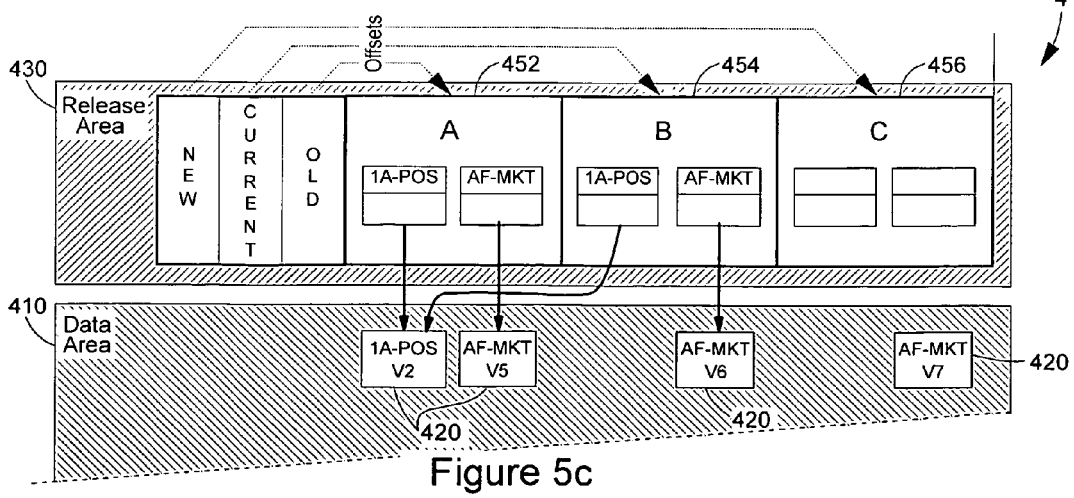

The next step 4, shown in FIG. 5c, consists in storing the new data snapshot in a new area 420 of the data area 410. This is done either by storing a completely new data snapshot or by first retrieving the current data snapshot and applying updates on it. However, in both cases, the snapshot is advantageously stored in a new data area 420.

Figure 5D:
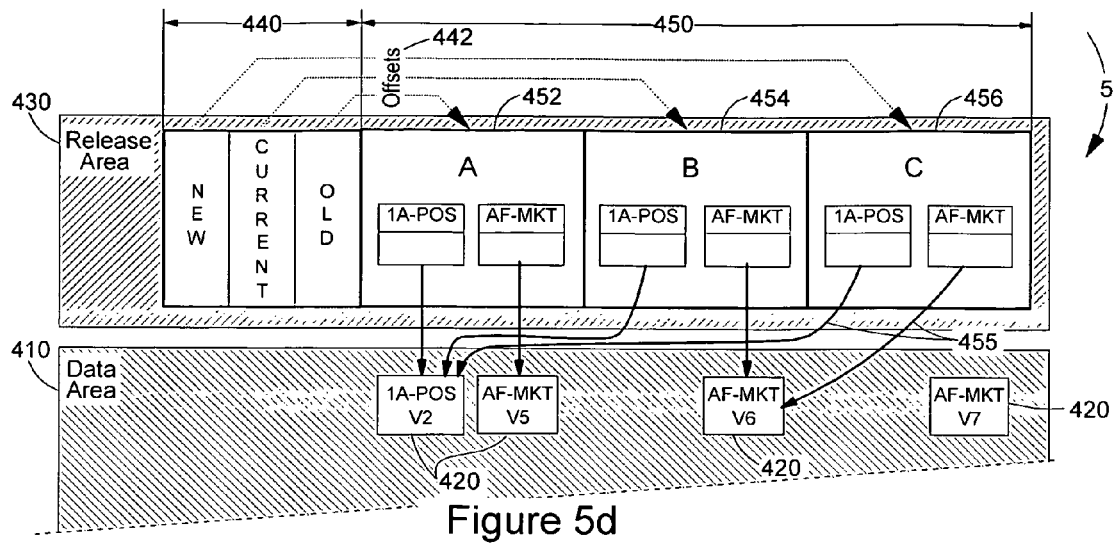
Figure 5E:
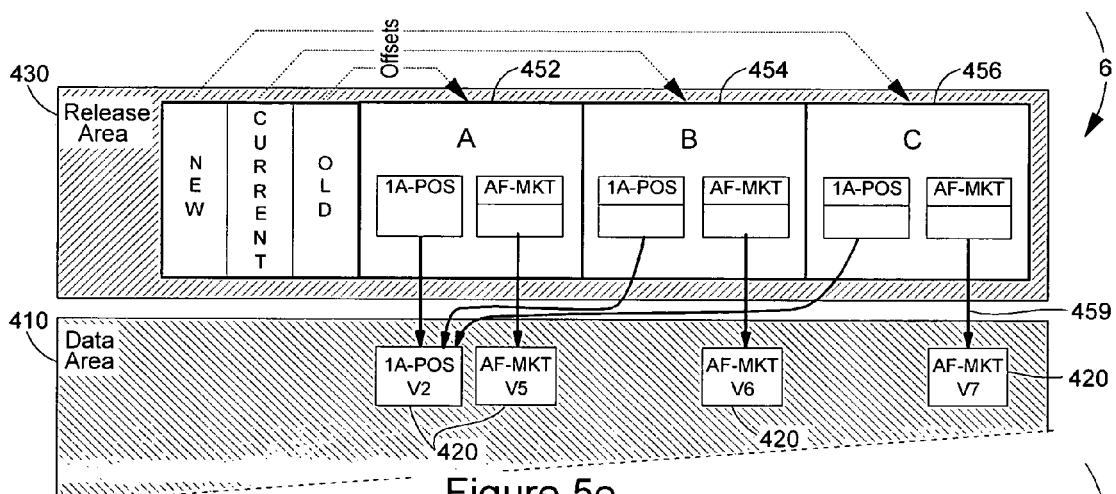
Figure 5F:
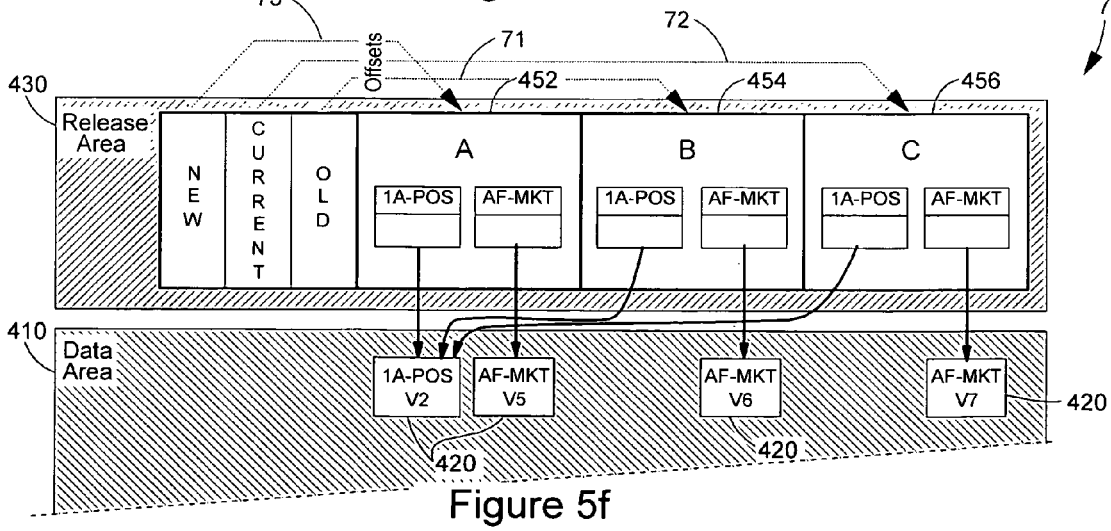

Then at step 5 content of the current version section 454 is copied in the new version section 456 so that the key links 455 address the same data snapshots as the one of the current version section 454. This is shown in FIG. 5d. At next step 6, as shown in FIG. 5e, the new version section 456 is then modified to address (link 459) instead the data area 420 containing the new data snapshot.

After which, at step 7, the offsets 442 of the area 440 are modified in such a way that:

at step 71, the old offset now addresses the current section 454;

at step 72, the current offset now addresses the new section 456;

at step 73, the new offset now addresses the old section 452.

The preliminary step mentioned above, or step 1, during which consistency of offsets 442 in the area 440 is checked is aimed at handling failure cases that may occur during write operations within the area 440.

Figure 5G:
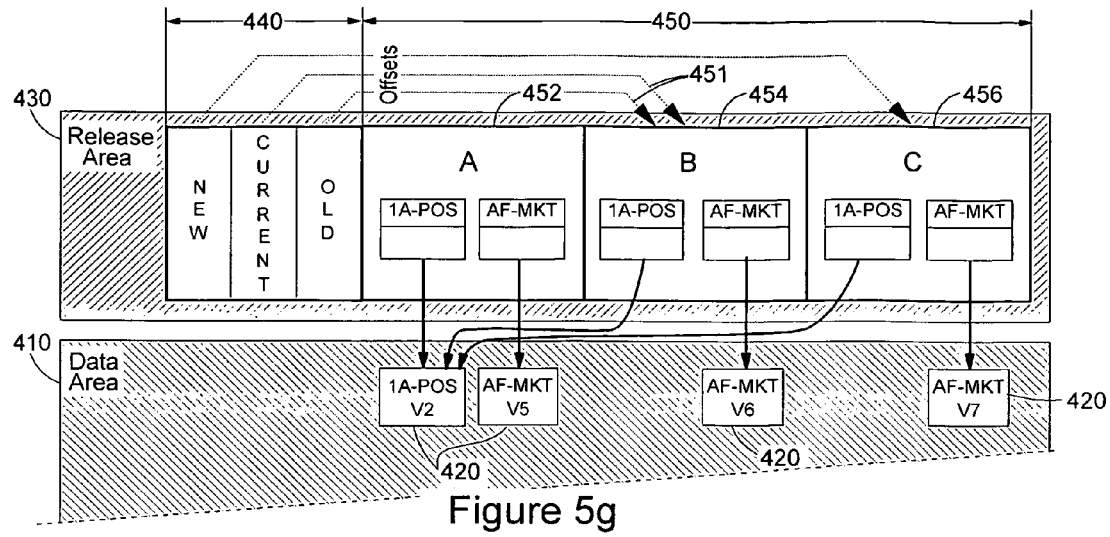

As shown in FIG. 5g two offsets may, after a failure, address (see reference 451) the same version section. In this case, the new or old offset of area 440 can be simply corrected to take care of this. Correction simply applies on which one of the new and old offsets that also targets the current section.

If updating process fails during the execution of steps 2 to 6 the addition of the new data snapshot is just cancelled because the only version section that has been modified is the new section 456. This section is not accessed by read operations. Read operations only use the current version section. Thus, the failing attempt to update the shared-memory has no side effects since on the next write the new version section will be erased and initialised from scratch as explained above. The new data area 420 will also be reused since not yet referenced by the release area 430.

If the process fails during the execution of steps 71 and 72, the snapshot addition is also cancelled because the read operations still target the current version section. The failure has no side effects since on the next attempt to add a new data snapshot the new version section will be erased and initialised from scratch as described above. It is not an issue to have the old offset addressing the current version section. The preliminary step that checks consistency and correct offsets will take care of this. FIG. 5g is an example of the status in which the release area 430 is left after a failure has corrupted the area 440 while attempting to add a new data snapshot 420 in the data area 410. The situation after offsets 442 have been recovered is equivalent to the one shown in FIG. 5e.

If the process fails between steps 72 and 73, the snapshot addition is however not cancelled and is considered to have successfully completed. Indeed, the read operations can actually target the current version section, which is now the just newly built version section 456. However, because the updating operation has not completed normally, the new offset of area 440 still address (see 453) the current version section 456. To prevent step 1 of next write operation from erasing the newly built version section, on the basis that this section is also the current one, consistency of offsets must be checked and corrections applied at step 1. Offset inconsistencies are easily detected since the new offset and the current offset address 453 the same version section 456. This is indicative that failure has occurred just after step 72. To recover completely from failure, the new offset is set to address the previous old version section, i.e., the remaining version section not addressed by any offset, 452 in this example.

Figure 5H:
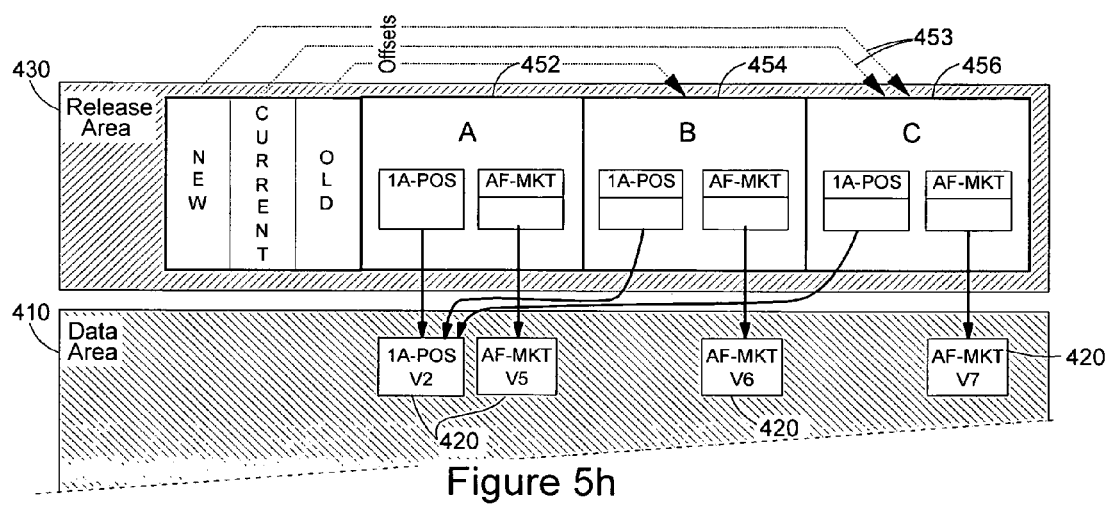
Figure 5I:
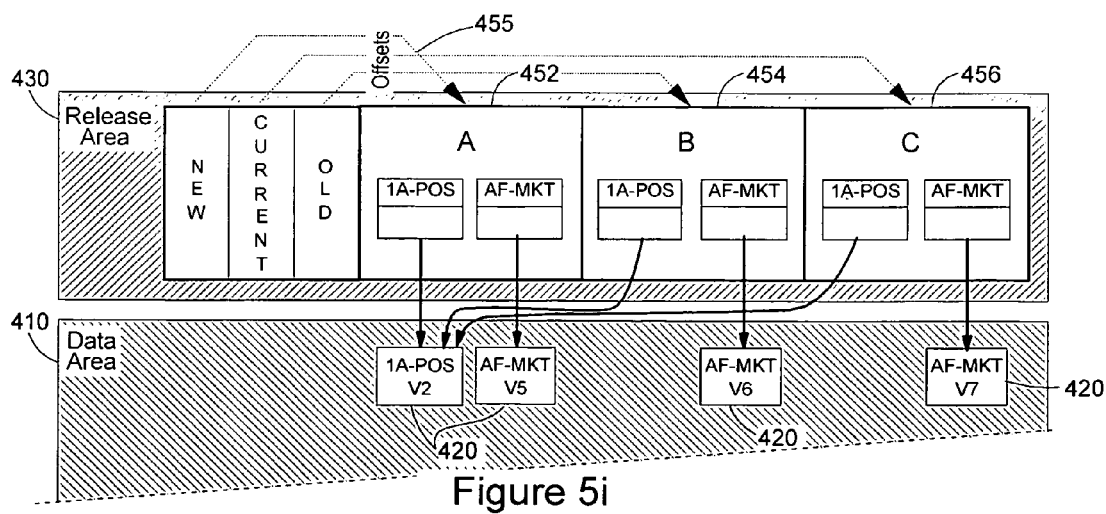

FIG. 5h shows such an example where the process of adding a new snapshot 422 fails after step 72. The status of the release area, after recovery of the offsets performed a step 1, is shown in FIG. 5i. The new control section has been corrected to address (see 455) the correct version section, i.e., 452 in this example. It is worth noting here that if process fails after step 73 this has no detrimental consequence since the atomic snapshot addition has already completed.

The basic structure of the version control file and its mode of operation described in FIGS. 4 and 5 above can be subject to variations to cope with the following issues:
concurrent writes are not supported because a global lock mechanism is used; and,
the size of the release area is fixed.

The following figures illustrate and discuss enhancements brought to the basic version control file that take care of these remaining issues.

Figure 6:
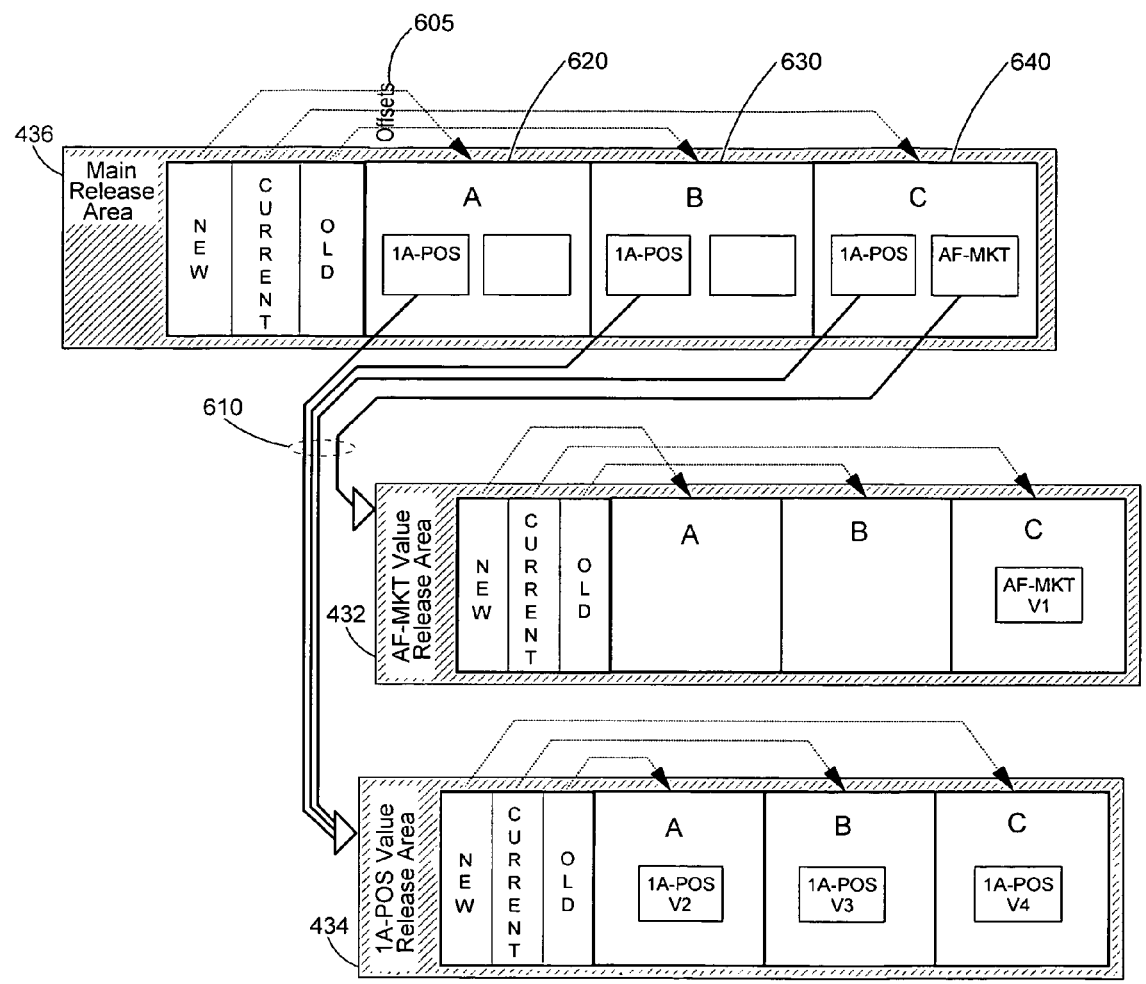
FIG. 6 shows a first enhancement brought to the basic structure of the version control file to optimize updating process and to handle concurrent writes.

FIG. 6 shows a first enhancement to optimize updating process and to handle concurrent writes.

The invention operates in an environment where the number of new key insertions is usually small as compared to the number of updates of specific key values. In this context, the operation of the basic structure of the version control described in previous FIGS. 4 and 5 suffers from one limitation. As explained previously in step 4, each time key values must be modified in the sections 452, 454, 456 of the release area 430, the whole version map (i.e. all key data) must be first copied at least once. To overcome this drawback the invention enhances the cache control structure previously described in creating a main release area 436 and plural release areas 432, 434 which now specifically handle values of inserted keys whereas the main release area 436 holds domain key definitions to access these release areas which are, in this context, named domain release area.

According to the embodiment, the data of the data area (or at least a portion of them) are distributed in various domains. The domains will usually not be of the same size and each corresponds to a group of sets of data, the nature of which shares some common points. By way of example, a domain can be assigned to rules for one airline and another domain can be assigned to rules of another airline.

FIG. 6 shows through an example how the basic structure of the release area is enhanced. The release area 430 discussed previously is now replaced by release areas 432, 434 used in conjunction with the main release area 436 holding in this example two domain keys, i.e.: 1A-POS and AF-MKT, each with their own versions. In this enhanced structure the main release area 436 is simply used to reference the stored keys which are associated with their own release areas, respectively: 434 and 432 in this example. All the links to the value release areas are shown with reference 610. Based on this enhanced structure the processes of adding one domain key (this may occur in particular when a new object is to be added in the cache) and modifying a key value are described hereafter.

FIGS. 7a to 7d describe the addition of a new domain key in the enhanced structure of FIG. 6. It is shown how new domain key definition data and values are added respectively in the main release area 436 and the release area 432.

When creating the control file 220, the main release area 436 and a certain number of value release areas, like 432 and 434, are pre-constructed. The most efficient way of managing memory is then to allocate a number of release areas matching the maximum capacity of the main release area 436.

Figure 7A:
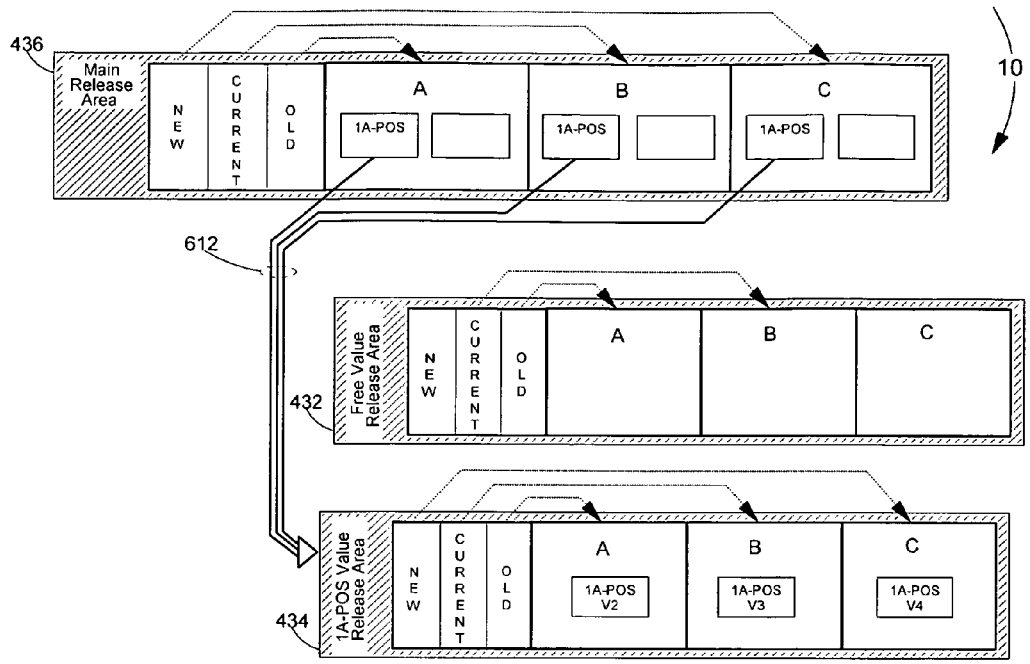
FIGS. 7a to 7d describe the addition of a new key in the enhanced structure of the enhanced structure of the version control file.

FIG. 7a shows the initial step of the process, i.e.: step 10, where main release area 436 holds only one domain key, i.e.: 1A-POS. In this enhanced structure the main release area 436 comprises main control sections A, B, C which address the domain release area: "1A-POS release area" 434 which holds the location/key of various snapshot versions of the object 1A-POS, namely: 1A-POS versions 2, 3 and 4, respectively in the old, current and new domain version areas of this dependent domain release area. Specific links 612 are created between main and dependent domain release area 434. The domain release area 434 comprises offsets as described in reference with the first embodiment of the invention. This is also the case for the main release area 436. FIGS. 6 and 7 show that the main release area 436 also includes offsets here called main offsets. In the example the structures of the main release area 436 and of the release areas 432, 434 are similar; however the number of offsets and main offsets may vary, although we use 3 offsets in both cases in our example.

Figure 7B:
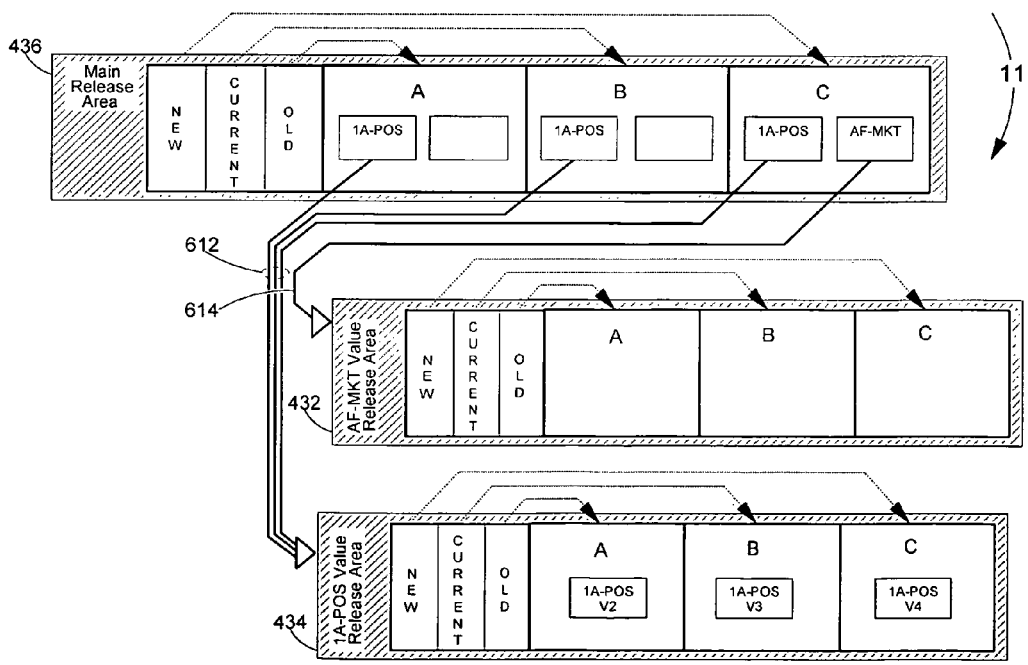

Following step 11 is shown in FIG. 7b where a new domain key, i.e. AF-MKT, is added in main release area 436 and a corresponding value release area 432 attributed. To this end definition data of this new domain key are defined in the main release area 436 for providing a specific link 614 which addresses the dependent domain release area 432.

Figure 7C:
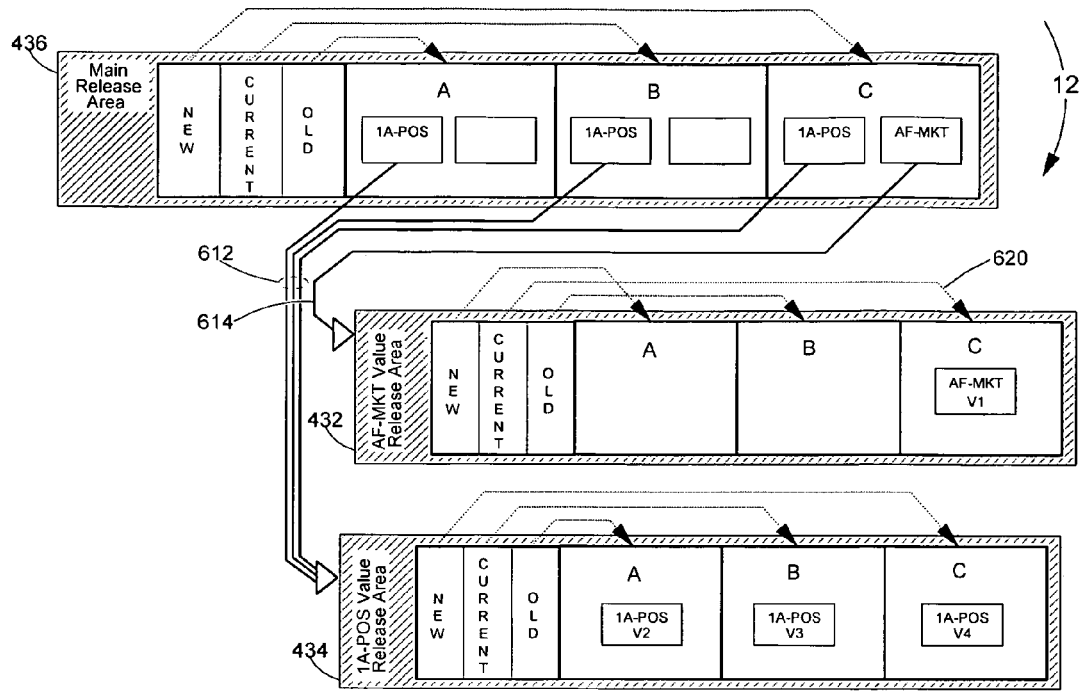
Figure 7D:
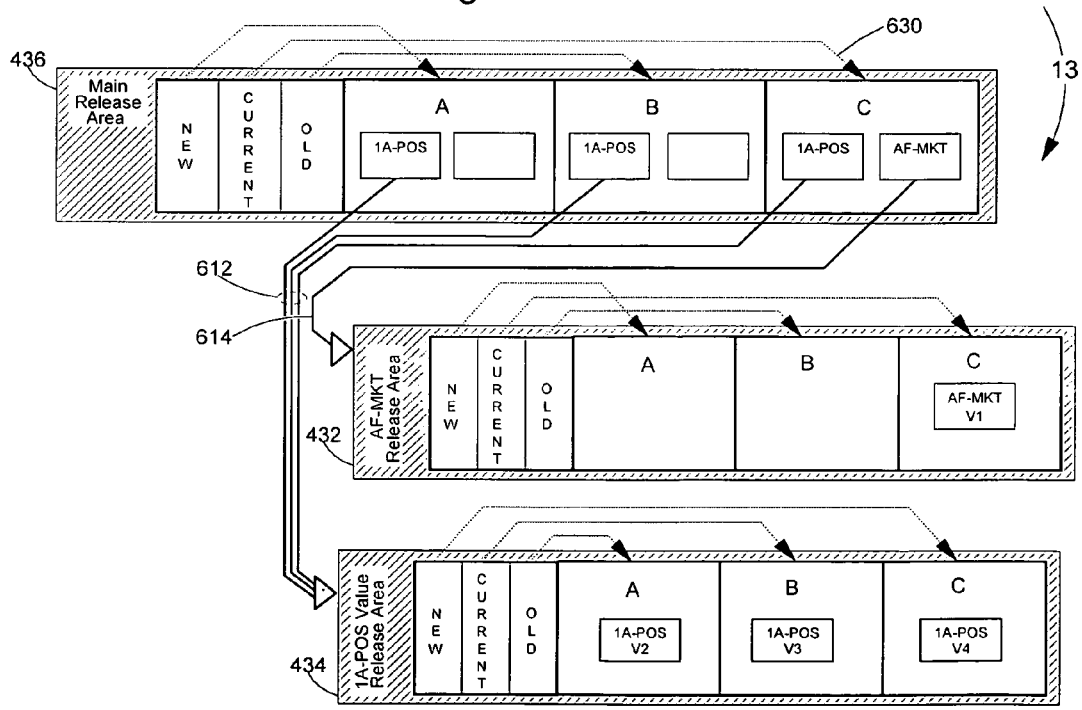

Then, at step 12 shown on FIG. 7c, the process described in FIG. 5 is applied. Offsets are modified so that the new inserted domain key AF-MKT V1 in the dependent domain release area 432 becomes the current key (620).

Similarly, the main offsets of the main release area 436 are modified to designate the key main version section C as becoming the current key path in 630. This is done at step 13 and result is shown on FIG. 7d. At completion of this step the write operation, i.e., the addition of a new domain key, has completed successfully.

The updating of an object is done as explained in FIG. 5. Only specific values need then to be updated which requires the manipulation of those values only at the level of the domain release area 432, 434; thus, avoiding the copy of a whole section of the main release area 436 during this operation.

In the enhanced structure of the version control concurrent writes becomes possible because the updated areas are completely segregated in the shared-memory. Then, it is possible to simultaneously perform the following operations:
adding one domain key in the main release area 436;
updating values/objects of different domain release areas.

Therefore, in an implementation featuring concurrent writes, one mutex, i.e., a piece of code devised to avoid the simultaneous use of a common resource by processes, is created authorizing write access by value and one for the main release area. The processes described above are made re-entrant by acquiring the relevant mutex(es) at the beginning of the write operation.

Figure 8:
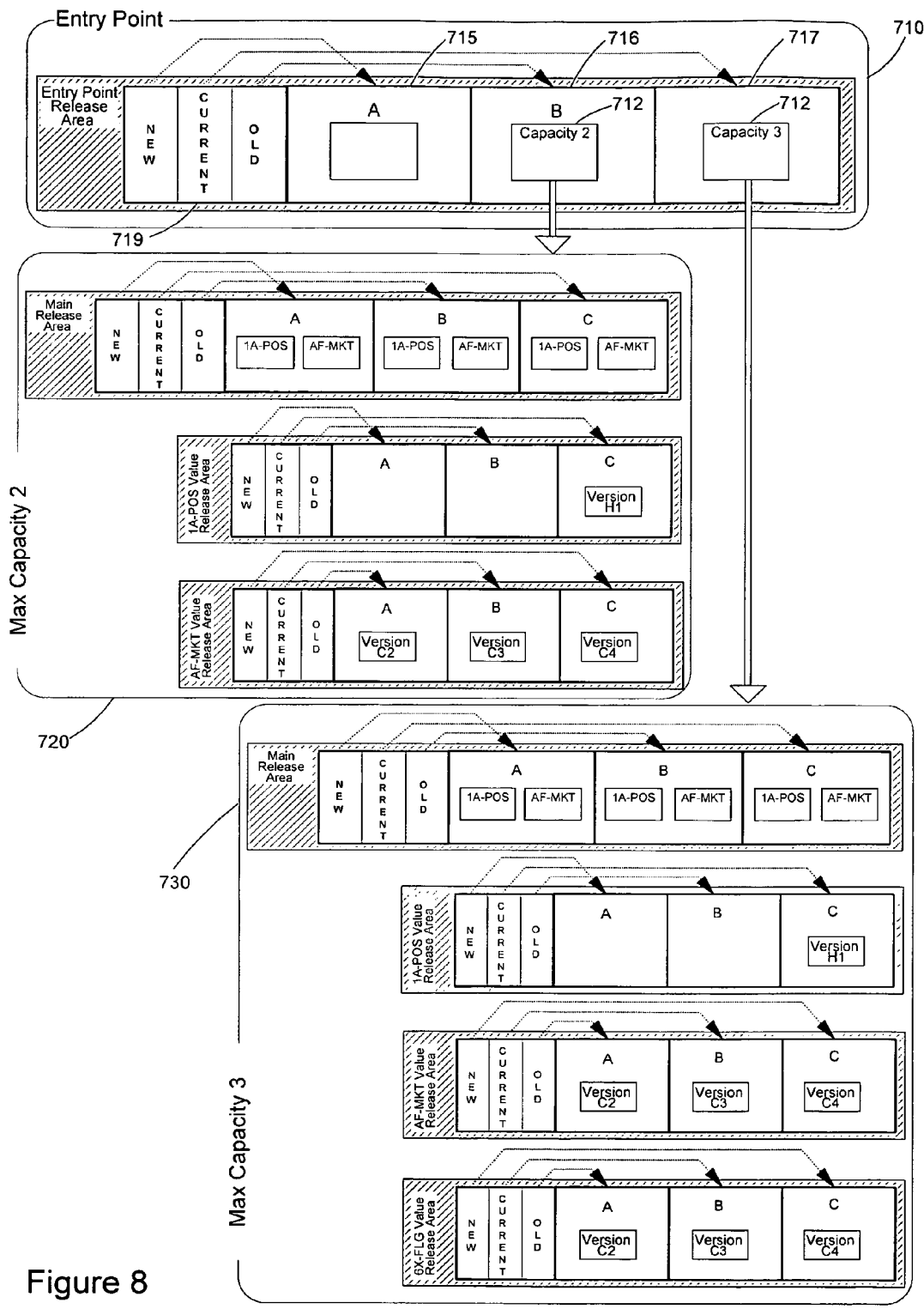
FIG. 8 discusses a second enhancement brought to the version structure that allows memory size of release areas to be increased when necessary.

FIG. 8 discusses a second enhancement brought to the version structure that allows memory size of release areas to be increased in order to solve the previously mentioned issue that they are of a fixed size.

If adding new data is straightforward when the allocated space is sufficient, things get more complicated when new sets of data and their control means must be allocated. The invention manages to get around this problem by adding a level of indirection. To this end, an entry point area 710 is used which can be a memory segment of the cache. The role of the entry point area 710 is thus to reference several control areas each advantageously made of a control file 220 holding the control data. The entry point area 710 is preferably another cache file that contains an entry point release area which itself comprises entry sections 715, 716, 717. The entry sections each contain the position and maximum capacity 712 of one control file actually holding one version control area structure described in previous figures, i.e., 720 and 730 in this example. The entry point area 710 has preferably the same global structure as the release areas and also comprises offsets here called entry offsets.

When adding a key, the write process performs the following steps:
1. Check whether the current control area has enough memory space left or not. If enough space is left the write occurs as previously described. However, if the remaining space is not sufficient:
2. A new control area is created with an increased size. For example, in FIG. 8, a file such as 730 is created.
3. Data from the current control area are copied into the new one. Optionally, if it is necessary to retrieve the old values, the whole content of the cache values are copied; otherwise, only the current values are copied.
4. The key is added in the new control area 730.
5. The current entry offset 719 is switched to entry section (717) pointing to the created control area 730.
6. Deprecated versions of data are erased to save resources.

The entry point area 710 uses the structure describes in FIGS. 4 and 5 so that to allow current control area to be switched without disturbing read accesses.

Because the entry point needs only to contain a structure of fixed size, it never requires new allocations and can serve as a fixed entry point.

The policy for computing the new control area capacity may be freely adapted and should result of a compromise between the number of times this procedure needs to be applied and the overall memory space.

Read accesses first read the entry point area to retrieve the current control area. The latter is reached at the main release area the current main offset of which specifies the current main version section. The current main version section provides the key link to reach the right domain release area. At this level, the domain release area's current offset points to the domain version section addressing the data area 420 to be accessed.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

The invention claimed is:
1. An apparatus comprising:
a memory; and
a cache memory structure stored in the memory, the cache memory structure comprising:
a data area with a plurality of cache files, wherein each cache file is configured to store a version of a set of data; and
a control area configured to control access to the plurality of cache files, wherein the control area comprises at least one release area that comprises:
at least one version area comprising:
a first version section, a second version section, and a third version section that are each configured to store at least one key that addresses data of at least one cache file, and
a version offset area comprising:
a new offset configured to point to one of the first version section, the second version section, and the third version section to thereby identify the pointed-to version section as a new version section,
a current offset configured to point to one of the first version section, second version section, and third version section to thereby identify the pointed-to version section as a current version section, and
an old offset configured to point to one of the first version section, second version section, and third version section to thereby identify the pointed-to version section as an old version section.

2. The apparatus of claim 1, wherein the control area comprises at least one file separate from the data area.

3. The apparatus of claim 1, wherein each version section stores values associated to one single key to access one cache file storing one version of a set of data assigned to said key, a plurality of sets of data are distributed in a plurality of domains the at least one release area is at least one domain release area, and the control area further comprises:
a main release area that includes main version sections that each store an access link corresponding to each domain release area; and
a domain offset area including a new main offset configured to point to a first main version section to thereby identify the first main version section as a new main version section, a current main offset configured to point to a second main version section to thereby identify the second main version section as a current main version section, and an old main offset configured to point to a third main version section to thereby identify the third main version section as an old main version section.

4. The apparatus of claim 3, wherein each set of data of the plurality of sets of data is distributed in a particular domain corresponding to a particular airline, and each set of data corresponds to business rules of the particular airline.

5. The apparatus of claim 1, wherein the cache memory structure consists of a shared memory.

6. The apparatus of claim 1 further comprising:
a plurality of control areas; and
an entry point area comprising entry sections,
wherein each entry section is configured to store an access link to one separate control area.

7. The apparatus of claim 6, wherein the entry point area comprises as many entry offsets as entry sections, each entry offset pointing to one entry section.

8. The apparatus of claim 1, wherein the set of data stored in each cache file corresponds to a flight schedule package for at least one airline, and each flight schedule package includes fare definitions and flight schedule data.

9. A method for controlling access to data stored in a cache memory during update stages comprising:
using a cache memory structure comprising:

a data area with a plurality of cache files, wherein each cache file is configured to store a different version of a set of data;

a control area configured to control access to the plurality of cache files, wherein the control area comprises at least one release area that comprises:

at least one version area comprising:

a first version section, a second version section, and a third version section that are each configure to store at least one key that addresses data of at least one cache file, and a version offset area comprising:

a new offset configured to point to one of the first version section, the second version section, and the third version section to thereby identify the pointed-to version section as a new version section, a current offset configured to point to one of the first version section, second version section, and third version section to thereby identify the pointed-to version section as a current version section, and an old offset configured to point to one of the first version section, second version section, and third version section to thereby identify the pointed-to version section as an old version section, and enabling access by an applicative process to the data of a cache file addressed by the version section pointed to by the current offset.

10. The method of claim 9 further comprising:

clearing the new version section;

storing a new version of at least one set of data in a cache file of the data area addressed by the key of the new version section;

storing new data version definition information in the new version section; and modifying the current offset to point to the new version section.

11. The method of claim 10 further comprising:

modifying the old offset to point to the current version section; and modifying the new offset point to the old version section.

12. The method of claim 11 further comprising:

after modifying the old offset to point to the current version section, enabling access by an applicative process to the data of a cache file addressed by the version section pointed to by the old offset.

13. The method of claim 12 wherein enabling the access is of a finite time.

14. The method of claim 9 further comprising:

defining an entry offset as current offset pointing to one entry section defined as current entry section;

enabling an access by an applicative process to the control area addressed by the current entry offset.

15. A computer program product stored in a non-transitory computer-readable medium and comprising instructions for executing the method of claim 9.

16. A method for controlling access to data stored in a cache memory structure comprising a data area with a plurality of cache files and a control area configured to control access to the plurality of cache files, the method comprising:

storing a new version of a particular set of data in a cache file among the plurality of cache files, wherein each cache file is configured to store a version of a set of data;

in response to storing the new version of the particular set of data in the cache file, modifying a key stored in a first version section of the control area to correspond to an address of the new version of the particular set of data in the data area; and in response to modifying the key stored in the first version section to correspond to the address of the new version of the particular set of data in the data area:

modifying a current offset of the control area to point to the first version section to thereby identify the first version section as the current version section, modifying an old offset of the control area to point to a second version section to thereby identify the second version section as the old version section, and modifying a new offset to point to a third version section to thereby identify the third version section as the new version section.

* * * * *

UNITED STATES PATENT AND TRADEMARK OFFICE
CERTIFICATE OF CORRECTION

PATENT NO. : 8,539,157 B2  
APPLICATION NO. : 13/068143  
DATED : September 17, 2013  
INVENTOR(S) : Virginie Amar Page 1 of 1

It is certified that error appears in the above-identified patent and that said Letters Patent is hereby corrected as shown below:

In the Specification:

At column 1, line 56, after "responded", insert --to--.

Column 3, line 33, after "operation", delete "may" and at line 56, change "is" to --as-- and at line 62, change "render" to --renders-- and at line 63, change "preserve" to --preserves--.

Column 5, line 5, change "view" to --viewed-- and at line 41, change "does" to --do-- and at line 43, change "sigger" to --bigger--.

Column 6, line 29, change "section" to --sections--.

Column 11, line 38, change "describes" to --described-- and at line 45, change "of" to --in--.

In the Claims:

At column 12, claim 3, line 32, change "domains" to --domains,--.

At column 13, claim 9, line 9, change "configure" to --configured--.

At column 13, claim 11, line 43, after "offset", insert --to--.

Signed and Sealed this  
Thirty-first Day of December, 2013

Margaret A. Focarino  
*Commissioner for Patents of the United States Patent and Trademark Office*